2 Sheets-Sheet 1.

S. S. Bartlett,

Mortising Machine.

No 1,852. Reissued Jan. 17, 1865.

Witnesses:
J. Henry Hill
D. S. McKenzie

Inventor:
Stephen S. Bartlett

AM. PHOTO-LITHO. CO. N.Y. (OSBORNE'S PROCESS)

2 Sheets, Sheet 2.

S. S. Bartlett,

Mortising Machine.

No. 1,852. Reissued Jan. 17, 1865.

Witnesses:

J. Henry Hill

D. L. McSpangen

Inventor:

Stephen S. Bartlett

AM. PHOTO-LITHO. CO. N.Y. (BORNE'S PROCESS)

UNITED STATES PATENT OFFICE.

STEPHEN S. BARTLETT, OF PROVIDENCE, RHODE ISLAND, ASSIGNOR TO HIMSELF AND THOMAS H. DODGE.

IMPROVEMENT IN MORTISING-MACHINES.

Specification forming part of Letters Patent No. 33,330, dated September 24, 1861; Reissue No. 1,852, dated January 17, 1865.

*To all whom it may concern:*

Be it known that I, STEPHEN S. BARTLETT, formerly of Woonsocket, in the State of Rhode Island, but now of Providence, in the county of Providence and State of Rhode Island, have invented certain new and useful Improvements in Mortising-Machines; and I do hereby declare that the following is a full, clear, and exact description of the same, reference being had to the accompanying drawings, which form a part of this specification, and in which—

Figure 1:
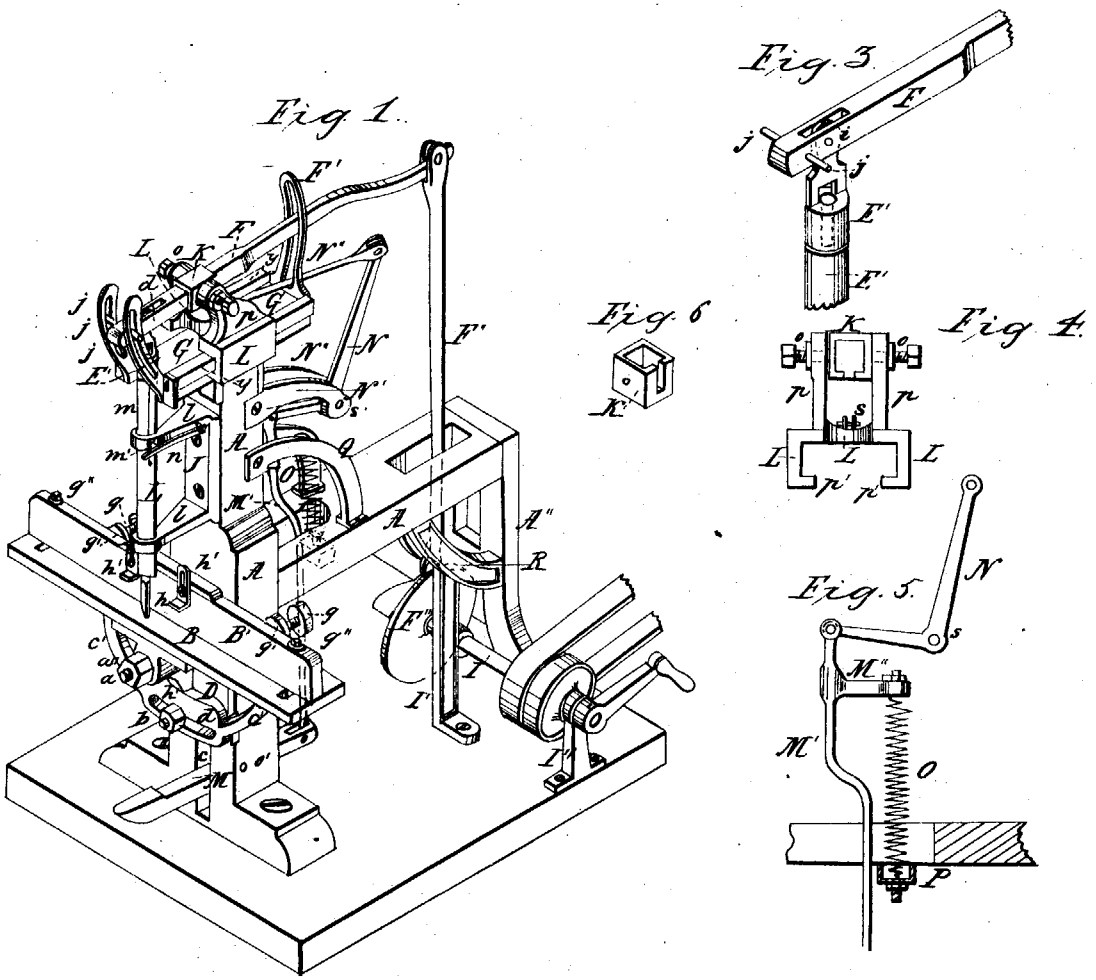
Figure 2:
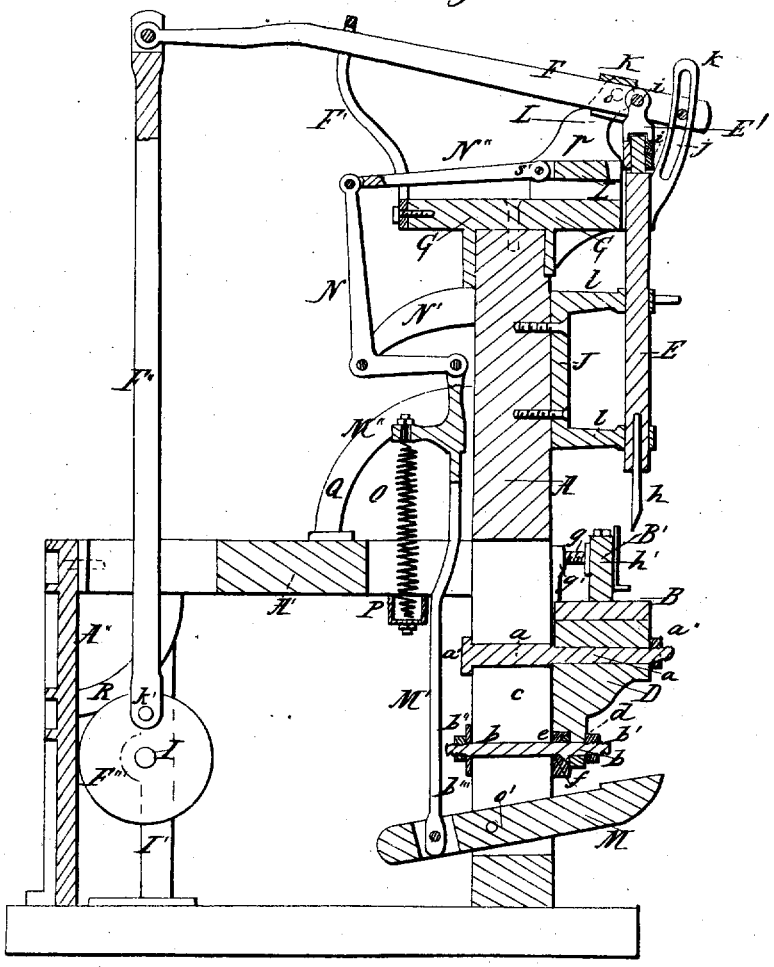

Figure 1 represents a perspective view of a mortising-machine with my improvements applied thereto. Fig. 2 represents a longitudinal central section of the machine; and Figs. 3, 4, 5, and 6 represent detached parts and sections.

In the drawings, A A′ A″ represent the main frame, and to the front of which is attached the bench or platform B in the following manner, viz: It is fastened securely to the top of of an iron frame or supporting-stand, D, which in turn is fastened to the front upright piece, A, of the main frame by means of two bolts, *a* and *b*, which both pass through a slot, *c*, in the piece A. The bolt *a* has a head, *a′*, which fits against the piece A on each side of slot *c*, and thereby is prevented from being drawn through. The front of bolt *a* is round, and passes through a hole in the upper part of frame D, and has a nut, *a″*, by means of which frame D can be firmly secured to the piece A whenever the operator may desire. The bottom of piece or stand D is made with a curved groove, *d*, and through which the front end of bolt *b* passes and receives a nut, *b′*. The rear end of bolt *b* has a nut, *b″*, for the purpose of fastening bolt *b* to the piece A, a washer or piece of iron, *b‴*, being placed between the nut and piece A. The bolt *b* is made with a convex hub, *e*, which fits into a concave in piece *f*, whereby, when nut *b″* is screwed up, piece *f* is firmly fastened to piece A, and whose upper surface is made so as to form an arc of a circle, of which the center of the hole in stand D, through which bolt *a* passes, is the center. The lower part of stand D is grooved out so as to fit the curved upper surface of piece *f*, whereby either end of platform B can be inclined down or up and still be securely supported.

The foregoing part of my machine operates as follows: The material to be mortised is placed upon the platform or stand B, and the guide-board B′ adjusted by the back screws, *g g*, which pass through ears *g′ g′*, fastened to piece A, so as to bring the material properly under the chisel *h* when the guide-board is fastened to platform B by the set-bolts *g″ g″*, which pass up through slots in the ends of the platform B. After guide-board B′ is fastened, the holding-caps *h′ h′* are let down upon the material, one on each side of the chisel, to keep the material from rising with the chisel.

If the operator desires to lower the platform B to receive thicker or wider pieces, he loosens nut *a″* and *b″*, when both bolts *a* and *b*, together with the platform B, can be lowered at pleasure and as far as desired.

Should the operator desire to cut the ends of his mortises on a bevel or incline, all that he has to do is to loosen nuts *a″* and *b′*, when he can revolve or rock platform B around bolt *a*, and in which case frame D, together with platform B, are sustained in a secure position by the curved part of piece *f*, which somewhat resembles the lower part of a bearing or journal-box. Platform B can thus be set in any desired inclined position, and there fastened by screwing up nuts *a″* and *b′*, or it can be governed by the operator. As the chisel is arranged to work directly over the central point of support of the platform B, the latter does not require so much power to hold the platform in the proper and desired position as it would if the chisel worked either to the right or left of such point.

Stand D is not cast solid, but with arms *c′ c′* to support the ends of platform B, thus combining lightness with proper strength. The curved surface of *f* sustains and guides the stand D when platform B is rocked or inclined in a sure and easy manner, and in performing light work it may not be necessary to tighten up nut *b′*, the tightening up of nut *a′* being sufficient; but this is a matter to be determined by the discretion of the operator.

When both nuts *a″* and *b′* are screwed up, platform B is held in a very secure and firm position, and when said nuts are both loosened there is no danger of the platform slipping down, as piece *f* is still firmly fastened to piece A by the rear part of bolt *b* and its nut *b''*, as before described.

From the foregoing it will be seen that my arrangement for supporting the material is very perfect, and under the complete control of the operator, enabling him to adjust the material into any desired position, and, besides, is of such construction as not to be liable to wear out of true or become deranged.

The chisel *h* is inserted in the bottom of the arbor E, the upper end of which is turned down, so as to pass loosely through a hole in the swivel-piece E', where it is retained by a small screw or pin, *i'*, which passes through swivel E' into a groove cut in the end of arbor E, as clearly indicated in Fig. 2, whereby arbor E and its chisel *h* can be turned or revolved by the operator at pleasure. Arbor E turns in proper bearings in the arms *l l*, which project out from the metal piece J, fastened to the front of the upright piece A. A groove, *m*, is cut in each side of the arbor E, and into which a guide-pin, *m*, on spring *n* fits, the object of pin *m'*, being to hold arbor E and its chisel from turning when in operation.

When the operator desires to finish the opposite end of the mortise, he withdraws pin *m'*, and turns the chisel and its arbor E halfway around, so as to bring the other groove in arbor E into proper position to let pin *m'* slip into the groove on the opposite side thereof. The upper end, *i'*, of the swivel-piece E' is pivoted or hinged in a slot in lever, F, whose front end carries a guide-pin, *j*, which works in curved slots, *j'* in the stands *k k*, fastened to the front of the head-piece G on top of piece A. The rear of lever F works in a slot in guide F', fastened to the back end of the head-piece G, while a pitman or connecting rod, F'', connects the rear end of lever F to a wrist, *k'*, on the face of pulley F''', which is fast on the end of shaft I, which is supported in proper bearings attached to standards I' I''.

Power is applied by belt to shaft I, which has a tight and loose pulley. (See drawings.) Pitman or connecting rod F'' passes through a slot in the piece, A' of the main frame.

As before stated, lever F is retained in its proper position longitudinally by means of guides or pins *j*, but this is not the point or fulcrum upon which it works or vibrates.

Lever F passes loosely through a collar, K, which is supported and turns easily on center pins or screws, *o o*, in the upper ends of standards *p p*, which project up from the top of the head or sliding stock L. The lower part of the sliding head-stock L is so made as to work easily back and forth on top of the head-piece or cap G, its flanges *p' p'* clasping the guide pieces *y y* upon the sides of the piece G, and thereby retaining head-stock L always in its proper position as respects the head-piece G, while being moved or slid back and forth to give the arbor E and its chisel *h* a greater or less stroke or motion, as the operator may desire.

M is a foot-lever pivoted at *o'* so as to work up and down in the slot *c* in the upright piece A of the main frame. To the rear of lever M is hinged the lower end of a connecting-rod, M', whose upper end is hinged to the short end of a right-angled lever, N, which turns on a fulcrum-pin, *s*, in the ends of arms N', fastened to the upright piece A. The end of the long arm of lever N is connected to the sliding head L by means of a connecting rod, N'', which is hinged to head L at *s'*.

An arm, M'', projects from the upper end of connecting-rod M', and to which arm is fastened a spring, O, the other end of said spring passes down through a slot in piece A', and is fastened to a metal piece, P, on the under side of piece A', as clearly indicated in the drawings.

When the operator's foot is removed from the treadle M, spring O draws down connecting-rod M', thereby depressing the short arm of lever N, which throws the upright or long arm of said lever forward, together with connecting-rod N'' and sliding stock or head L, with its sliding or shifting collar or fulcrum K, whereby the fulcrum or axis *o* of the collar K is brought forward until it becomes coincident, or nearly so, to the axis of the hinge of the swivel-piece E', where it is hinged to lever F, thus arresting the motion of the arbor E' with its chisel *h*.

Collar or fulcrum piece K is grooved or recessed out on its front lower side, as seen in Figs. 4 and 6, so as to enable collar or fulcrum K to pass directly over the top of swivel-piece E' and arbor E, in order to stop all reciprocating motion of the latter.

By my improvements a difficulty encountered in using power mortising-machines previous to my invention is entirely obviated—viz., that which arose from the fact that the chisel could not be forced down at first to any considerable depth but had to stop at short stroke and then strike deeper and deeper at each successive stroke until it reached to the depth required for the mortises.

My machine above described when first started gives no motion to the chisel—that is, when the fulcrum of collar K is concentric with the pin which connects the top of the swivel E' with lever F, nor does it give but a slight motion when the parts are in the position indicated in Fig. 2, in which the fulcrum of collar K is represented as drawn back a little from the hinge of swivel E' in order to show the parts more clearly.

After the machine is once started the driving-belt does not have to be interfered with at all until the work is accomplished.

When the material to be mortised has been properly arranged upon the platform B, the operator starts the machine, and then presses down treadle M with his foot, whereby the sliding head L, together with collar K, are drawn back, thus gradually increasing the stroke of the chisel and varying the distance between the top of the table or platform and the lowest point cut by the chisel at any one stroke, the connecting-rod F″ and pulley F‴ being all the while run at a uniform motion.

It will thus be seen that by my invention power mortising machines are at once and easily adapted to all the contingencies under which they may be used, since after the machine is once started the operator can increase, diminish, or even stop the motion of the chisel, while the motion of the rear end of the lever F is all the time continued by power communicated from a power-wheel, engine, or drum to pulley on shaft I.

The operator can also, without stopping his machine or slipping belts, or loosening nuts or bolts, cut mortises, not only of different depths, but can also cut them in different sized sticks or pieces.

In cutting mortises in very hard wood the easy adjustment of the throw of the chisel—while at the same time it is driven by a positive motion—renders the machine of great utility and practical importance. Again, the whole adjustment is effected by the operator's foot pressing down treadle M, in connection with the spring O, as before described. The sliding wrist, collar, or fulcrum K is so arranged that it is above or higher than the platform upon which the material rests while the mortises are being cut, and consequently is well out of the way of flying chips and dirt while the machine is in motion, and hence there is not that danger of the same becoming clogged up, as would be the case if it was below the platform or lower than the top thereof. The main frame is braced or stayed by the braces or stays Q and R.

It will be seen that as lever F passes through the collar or fulcrum piece K the latter becomes the fulcrum upon which the former works, and that the front end of lever F, to which arbor E is attached, will have a greater or less vibration dependent upon the way and the distance the sliding head L and collar or wrist K are moved from any particular point upon the cap or head piece G, thus increasing or diminishing the stroke of the arbor E and its chisel *h*, the foot-lever M, when pressed down, increasing the chisel's stroke, and spring O, when allowed to contract, diminishing it.

Having described one good and practical mode of applying my improvements in mortising machines to use, what I claim therein as of my invention, and desire to secure by Letters Patent, is—

1. Giving the bed or table in a mortising-machine two independent supports, so that the upper support may be loosened to permit the bed or table being adjusted or placed in a horizontal or inclined position, while the bottom support prevents the table or bed from sliding or dropping down bodily during the operation, whereby mortises can be cut perpendicular through the timber, or beveled to any angle required.

2. So combining the bed or table in a mortising-machine with its supporting mechanism as that said table or bed can be freely rocked back and forth by the operator upon a center or axis of motion above the support upon which it rests and turns, whereby mortises with perpendicular or inclined ends can be cut at the will of the operator, substantially as and for the purposes described.

3. The combination of the head-piece G, sliding head-stock L, and its lever-adjusting fulcrum or collar K, with lever F and arbor E, substantially as and for the purposes set forth.

4. The combination of the platform B and stand D with the main frame and supporting-piece *f*, substantially as and for the purposes set forth.

5. So arranging in a mortising-machine the sliding or movable wrist or collar, by which the change of motion of the arbor and chisel is obtained, as that it shall be above or higher than the platform upon which the material to be mortised rests, whereby it is comparatively free and safe from flying chips and dirt and other clogging matter.

STEPHEN S. BARTLETT.

Witnesses:
J. HENRY HILL,
D. S. MESSINGER.